United States Patent
Boyd et al.

(10) Patent No.: US 11,126,277 B1
(45) Date of Patent: Sep. 21, 2021

(54) MOLDABLE INPUT DEVICE SYSTEM

(71) Applicant: Mouse Tailor Group LLC, Denver, CO (US)

(72) Inventors: Cole S. Boyd, Golden, CO (US); Tyler Bacon, Golden, CO (US); Gabriel DeSouza, Golden, CO (US); Jacob Humphrey, Denver, CO (US)

(73) Assignee: Mouse Tailor Group LLC, Denver, CO (US)

( * ) Notice: Subject to any disclaimer, the term of this patent is extended or adjusted under 35 U.S.C. 154(b) by 0 days.

(21) Appl. No.: 16/853,506

(22) Filed: Apr. 20, 2020

(51) Int. Cl.
*G06F 3/0354* (2013.01)
*B29C 70/68* (2006.01)
*B29L 31/34* (2006.01)

(52) U.S. Cl.
CPC .......... *G06F 3/03543* (2013.01); *B29C 70/68* (2013.01); *B29L 2031/34* (2013.01); *G06F 2203/0333* (2013.01)

(58) Field of Classification Search
CPC ......... G06F 3/03543; G06F 2203/0333; B29C 70/68; B29L 2031/34
USPC .................................................. 345/169, 163
See application file for complete search history.

(56) References Cited

U.S. PATENT DOCUMENTS

| | | | | |
|---|---|---|---|---|
| 4,857,401 A | * | 8/1989 | Sieverding | B32B 15/08 428/336 |
| 4,934,024 A | * | 6/1990 | Sexton, I | A63B 60/12 16/421 |
| 2011/0241992 A1 | * | 10/2011 | Jameson | G05G 9/047 345/161 |
| 2014/0267040 A1 | * | 9/2014 | Theytaz | G06F 3/039 345/163 |

OTHER PUBLICATIONS

Tinylittlelife.org ("Homemade Ergonomic Mouse", 2006, retrieved from web on Feb. 2, 2021 from https://web.archive.org/web/20100311183844/http://tinylittlelife.org/?p=122, hereinafter "tinylittlelife") (Year: 2006).*

* cited by examiner

*Primary Examiner* — Mark Edwards
(74) *Attorney, Agent, or Firm* — Perkins Coie LLP (57) ABSTRACT

Embodiments of the present disclosure are directed to a moldable input device. A moldable input device may comprise a thermoplastic polymer layer that is heatable to achieve a moldable condition that allows for a reconfiguration of the thermoplastic polymer layer. After heating, the thermoplastic polymer layer may then be placed on a rigid outer shell of an input device and molded by user engagement (e.g., a user's hand). After a certain period of time, the thermoplastic polymer layer will have cooled and hardened, capturing the molding impressions and imprints of the user's hand. The rigid outer shell may then be affixed to a base plate of an input device, and the rigid outer shell and the base plate may form an enclosed cavity, wherein circuitry for an input device is maintained and protected. In some examples, the thermoplastic polymer may be polycaprolactone or ethylene vinyl acetate.

20 Claims, 6 Drawing Sheets

MOLDABLE INPUT DEVICE SYSTEM

TECHNICAL FIELD

The present disclosure is related to the field of input devices and/or pointing devices that are configured to receive input from a user and convert that input into computer generated output (e.g., moving a cursor around on a computer screen).

BACKGROUND

A wide variety of input devices, such as computer mice and other hand-held pointing devices that are used to control the graphical user interface (GUI) of a computer, exist today and have existed in different forms and variations for the past fifty years. Computer mice are the primary means by which a cursor is optimally controlled for operation of a computer. Computer mice are configured to detect two-dimensional motion relative to a surface and translate the motion of the mouse to the motion of a pointer on a display. However, these input devices are static and not customizable. The majority of computer mice, for example, are formed out of injection-molded plastic, such as acrylonitrile butadiene styrene (ABS) plastic Using such materials for designing an input device result in a fixed/static design that cannot be changed or customized.

Because current input devices are not configured to be customizable to a user's hand, they are oftentimes uncomfortable and cumbersome for the user. In some cases, these one-size-fits-all input devices can result in physical injury, such as carpal tunnel syndrome, arthritis, and other similar ailments. In yet other cases, these non-customizable input devices may preclude some users from using the input device because of previous/existing conditions (e.g., multiple sclerosis) and/or mobility disabilities that may prevent a certain user from using a one-size-fits-all mouse.

Furthermore, many materials that are used to form current input devices are incapable of customization. For instance, silicone rubber cannot be re-formed once set. Plastic acrylic requires too high of a temperature for custom molding. Dental alginate cannot be re-formed. Polypropylene carbonate has a melting temperature that is below room temperature and is possibly toxic. Polyethylene has too high of a melting temperature and is uneconomical. Methacrylic acids are also unable to re-form after being heated to a certain temperature.

As such, a current need exists for a more customizable and comfortable input device that conforms to a user's preferences and physical characteristics and that is constructed out of viable materials that can be molded and reconfigured multiple times.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. The following detailed description is, therefore, not to be taken in a limiting sense.

Embodiments of the present application are directed to systems and methods associated with moldable input devices. A moldable input device may comprise a formable layer that is comprised of a thermoplastic material that, when heated to a certain temperature, may be molded (or at least the outer surface is moldable) to conform to the physical characteristics of a hand of a user. The thermoplastic layer may be attached to a rigid outer shell of an input device. The rigid outer shell may connect to a base plate. In between the rigid outer shell and the base plate may exist a printed circuit board or other similar electronic circuitry that is standard for input devices, such as computer mice. In certain embodiments, it may be possible to use a thermoset polymer instead of a thermoplastic polymer although a thermoset polymer typically may only be configurable a single time. Thus, while generally described as a thermoplastic, in certain instances, a thermoset polymer may be usable.

Figure 1:
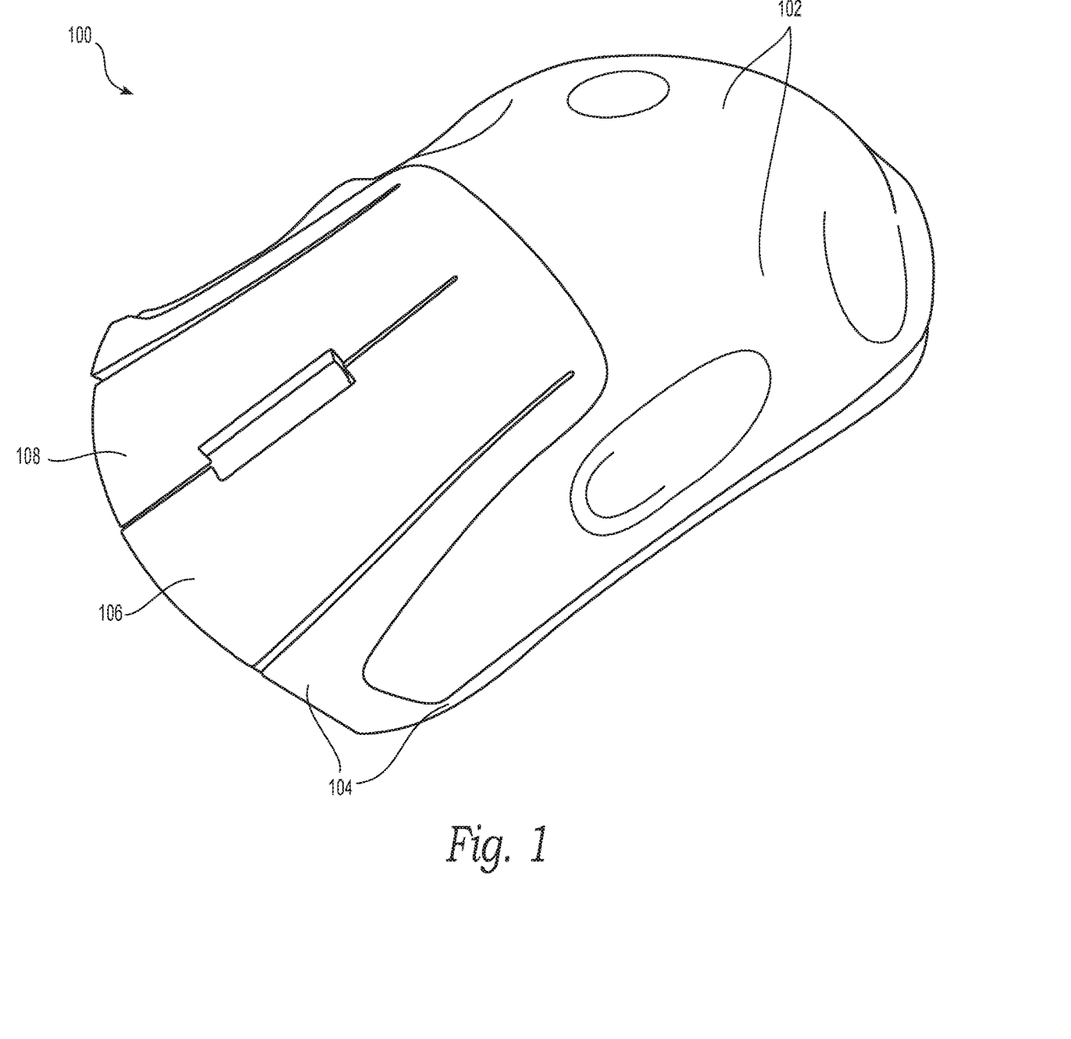
FIG. 1 is a top perspective view which illustrates a particular embodiment of the moldable input device system.

The thermoplastic layer may be a polymer, such as polycaprolactone (PCL) and/or ethylene vinyl acetate (EVA). PCL is a biodegradable and bioresorbable polymer that is easy to manufacture, manipulate, and blend. PCL typically has a low melting point around 60-65 QC and imparts advantageous resistance to water, oil, solvent, and chlorine. Throughout this specification, "melting point" refers to the temperature at which a material is pliable and/or moldable until cooled. PCL is prepared by ring opening polymerization of c-caprolactone using a catalyst such as stannous octoate. The synthesis of PCL is shown below:

Another thermoplastic polymer that may be used in forming a moldable input device is ethylene vinyl acetate (EVA). EVA is a copolymer of ethylene and vinyl acetate. The weight percent of vinyl acetate usually carries from 10 to 40%, with the remainder being ethylene. In some examples, the weight distribution may be 20% ethylene and 80% vinyl acetate. EVA is an elastomeric polymer that produces materials which are rubber-like in softness and flexibility. The material has low-temperature toughness, stress-crack resistance, hot-melt adhesive waterproof properties, and resistance to UV radiation. The structure of EVA is shown below:

FIG. 1 illustrates a top perspective view of a particular embodiment of the moldable input device 100. FIG. 1 shows a moldable thermoplastic layer 102 and a rigid shell 104. Rigid shell 104 may be composed of hard plastic material, such as ABS plastic. Thermoplastic layer 102 may be composed of a polymer, such as PCL and/or EVA. In some example aspects, layer 102 may cover a portion of shell 104. As illustrated, layer 102 covers the majority of shell 104, but does not cover buttons 106 and 108. In other example aspects, the thermoplastic material may cover the majority of shell 104, including buttons 106 and 108. In yet other embodiments, the thermoplastic material may be deposited in isolated locations on the input device 100. For instance, thermoplastic layer 102 may be deposited on buttons 106 and 108 in separate locations and also on the back portion of the shell 104 (i.e., three separate locations of thermoplastic mold deposited on the outer shell 104). In other examples, the thermoplastic layer 102 may be deposited on the sides of the input device 100. Some input devices may comprise side buttons (not illustrated). Thermoplastic layer 102 may be deposited on and/or around such side buttons to provide a more customizable feel for the user and better ergonomic comfortability.

Prior to the molding of thermoplastic layer 102, thermoplastic layer 102 may need to heat up to a pliable state at which point a user may be able to shape the thermoplastic layer to a customized mold. As mentioned previously, PCL has a melting point of roughly 60-65° C. EVA has a melting point of roughly 90° C., depending on the ratio of vinyl acetate to ethylene. Lower vinyl acetate content typically results in a lower melting point for EVA. In some instances, thermoplastic layer 102 may be heated through boiling water. In some instances, when the thermoplastic layer 102 reaches a temperature between 42° C. and 75° C., it may be in a moldable condition. Layer 102 may be submerged into boiling water (approximately 100° C., but may be lower or higher depending on geographic location) for a period of time (e.g., three minutes). Once the layer 102 reaches a melting point (e.g., approximately 65° C. in some examples), the layer 102 may be cooled. One example of cooling is through placing the heated layer 102 in room temperature water for a period of time (e.g., thirty seconds). Once the heated layer 102 is cooled but still hot enough to be moldable, the heated layer 102 may be molded by a user. The thermoplastic layer 102 may be placed onto the shell 104 and molded by a user's hand for a period of time (e.g., two minutes). During the molding period, the layer 102 may become hardened as it continues to decrease in temperature.

In other aspects, the layer 102 may be re-heated and re-molded. Because layer 102 is comprised of a particular thermoplastic polymer, such as PCL or EVA, layer 102 may be re-molded multiple times.

In other example aspects, layer 102 may be pre-affixed to outer shell 104. Shell 104 may be constructed to resist fluids (e.g., water) and high temperatures (e.g., boiling water at 100° C.). Shell 104 may be connected to a base plate, wherein the connection of shell 104 and the base plate form an encapsulated input device shell that protects the interior cavity housing any circuitry, such as a printed circuit board. The shell 104 may be impervious to fluids and able to be submerged under boiling water. In such aspects, the layer 102 may not need to be removed from shell 104 prior to the molding process. As such, the entire input device 100 may be heated (e.g., submerged in boiling water). After heating, the shell 104 may remain intact and not be moldable (due to its higher melting point temperature), but the thermoplastic layer 102 may be moldable. The user may then form the thermoplastic layer 102 around the shell 104 as the thermoplastic layer 102 cools down and hardens.

In other examples, the thermoplastic may be removed from the shell 104 and heated as a stand-alone component of the input device 100. After heating, thermoplastic layer 102 may be secured to shell 104 so that the user may conform layer 102 to the user's hand and the shell 104.

Other methods of heating may be utilized to bring thermoplastic layer 102 to its melting point and beyond. For example, utilizing radiation to heat the thermoplastic layer 102 may be used. Induction heating may be used to heat thermoplastic layer 102, and dry heat (e.g., dispensed from a hair dryer) may be used to heat the thermoplastic layer 102. Heating the thermoplastic layer 102 in a heating enclosure (e.g., oven) at or above the melting point for layer 102 (e.g., 60° C.) may be used, as well.

Figure 2:
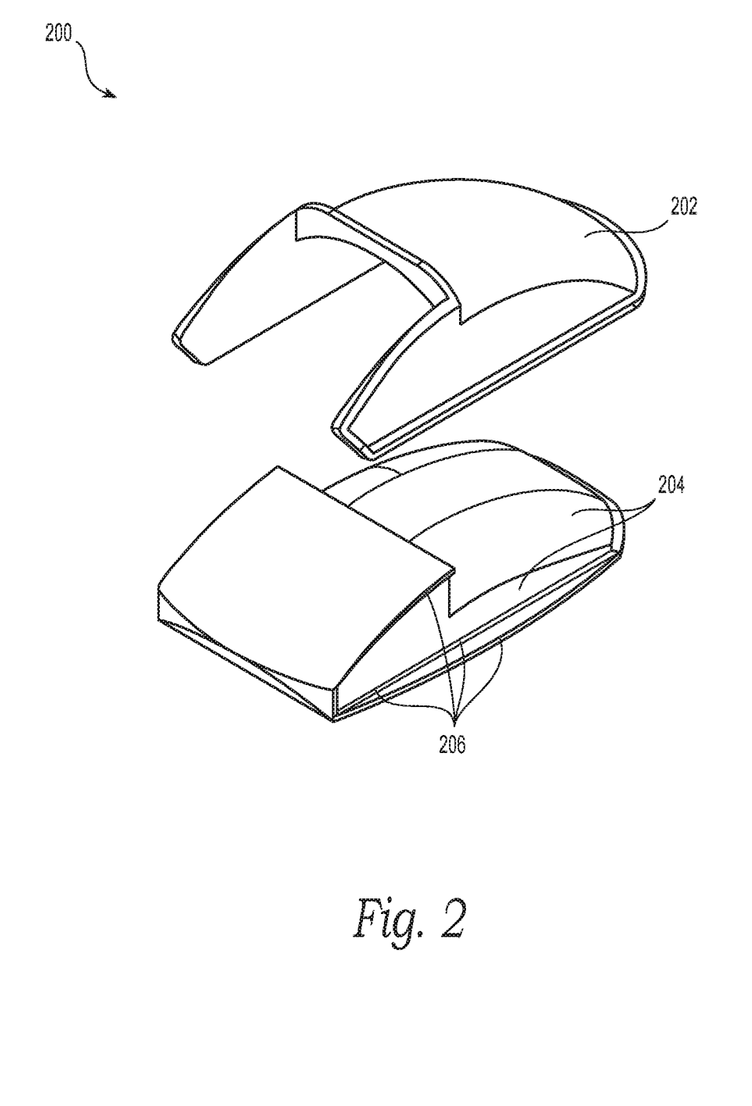
FIG. 2 is a side perspective view which illustrates the steps of forming an embodiment of the moldable input device system by connecting a thermoplastic mold to a rigid shell.

FIG. 2 illustrates a side perspective view of the steps of forming an embodiment of the moldable input device 200 by connecting a thermoplastic mold layer 202 to a rigid shell 204. As illustrated, shell 204 contains edges (and/or grooves) 206 that contain flowable material, such as thermoplastic material that comprises layer 202. The edges 206 may contain layer 202 to prevent spillage of layer 202 on the bottom portions of input device 200. Such spillage may result in friction, discomfort, improper forming, and inoperability of input device 200.

Figure 3:
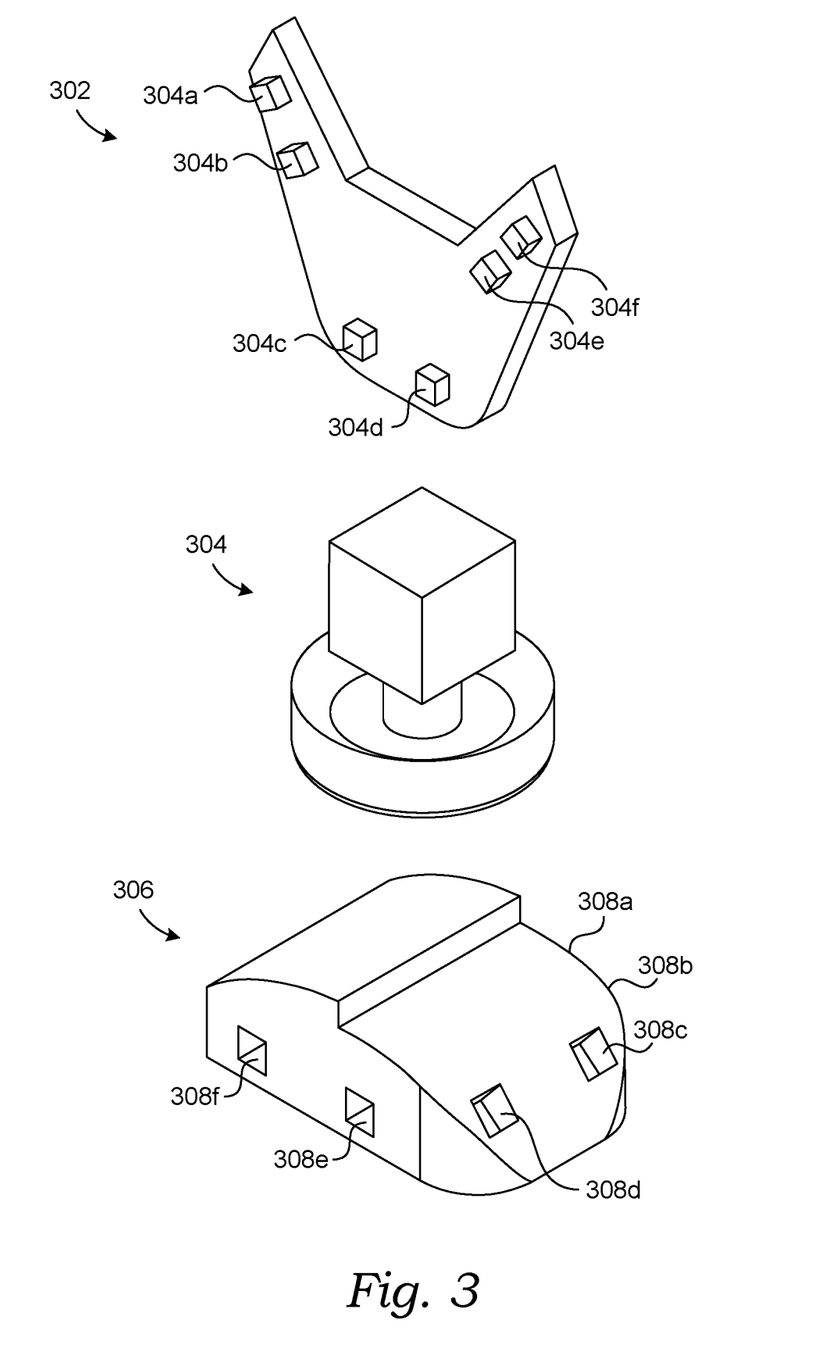
FIG. 3 is a side perspective view of the steps of forming an embodiment of the moldable input device system by connecting a thermoplastic mold layer comprising at least one anchor to a rigid shell comprising at least one anchor port.

FIG. 3 illustrates a side perspective view of the steps of forming an embodiment of the moldable input device 200 by connecting a thermoplastic mold layer 302 with at least one anchor 304a-f to a rigid shell 306 with at least one anchor port 308a-f. In some example aspects, layer 302 may be affixed with anchors 304. The anchors 304 may be attached to the thermoplastic layer 302 and connect to the shell 306 after heating. The anchors 304 may be used to more securely connect layer 302 to shell 306. In one embodiment, shell 306 may contain two anchor ports on each side of the shell (anchor ports 308a, 308b, 308e, and 308f), for a total of four anchor ports. Shell 306 may also contain two more anchor ports on the back of input device in the area labeled 308c and 308d. The layer 302 may contain six anchors (304a-f) that may fit into each of the anchor ports (308a-f) on the shell 306, securely connecting the thermoplastic layer 302 to the rigid shell 306. In some embodiments, a single anchor and anchor port may be used to affix thermoplastic layer 302 to rigid shell 306. In other embodiments, a plurality of anchors and anchor ports may be used to affix thermoplastic layer 302 to rigid shell 306.

In some embodiments, customized side buttons may be affixed to a moldable input device. Such customizations may require separate deposit of thermoplastic layer 302. For instance, a thermoplastic layer may be deposited on the top side of input device 300 and one of the two sides of input device 300, but one of the two sides of input device 300 may not have any thermoplastic material in order to expose custom buttons. In other embodiments, the custom buttons on the side of input device 300 may have thermoplastic deposit locations, providing for a customized button mold. For instance, the customized side buttons may be formed as "pockets" where thermoplastic material may be deposited into the "pocket" while the thermoplastic material is heated, and the user may apply force to the heated thermoplastic material in the side button "pockets" to form the thermoplastic according to the user's preferences and physical characteristics.

Figure 4:
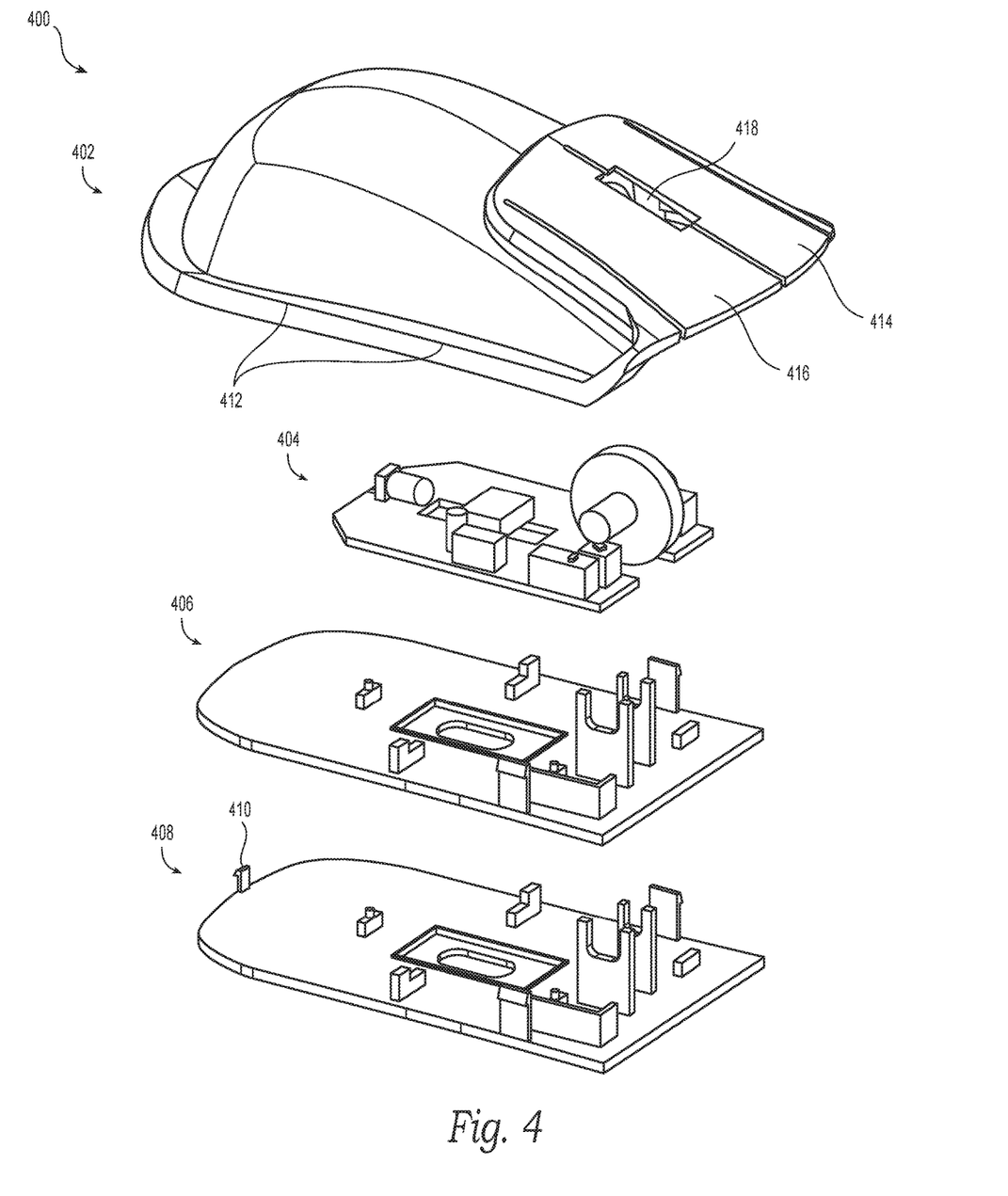
FIG. 4 is a side perspective view which illustrates the steps of a particular method of forming an embodiment of the moldable input device system, including connecting the rigid shell, a printed circuit board, and a base plate together.

FIG. 4 is a side perspective view which illustrates the steps of a particular method of forming an embodiment of the moldable input device system 400, including connecting the rigid shell 402, a printed circuit board 404, and a base plate 406/408 together. As described previously, outer shell 402 may comprise edges (and/or grooves) 412. Edges 412 may be utilized to prevent thermoplastic material from spilling over the input device 400 during the molding process. Edges 412 may also protect the buttonology of the input device 400 by preventing the thermoplastic material from covering the buttons, such as buttons 414 and 416, or obstructing or interfering with the input device wheel slot 418.

In some embodiments, the area where buttons 414, 416, and wheel slot 418 are located may comprise a touchpad or trackpad. Edges 412 may prevent thermoplastic material from spilling over onto the trackpad area. In other examples, the trackpad area may be configured to receive a thermoplastic deposit, wherein edges 412 may exist on the bottom portion of the shell 402 and not the top portions. In other words, the trackpad area may be flush (or near flush) with the body of the shell 402, so as to provide a smooth and consistent surface for application of the thermoplastic layer. In such examples, the thermoplastic layer may be deposited as a thin film over the trackpad and/or touchpad to ensure uninterrupted/unobstructed functionality of the trackpad/touchpad.

In one embodiment, the input device 400 is configured by connecting outer shell 402 with base plate 406. The connection of shell 402 and base plate 406 form an internal protective cavity, wherein the PCB 404 is housed. The PCB 404 may comprise the necessary circuitry for operation of the input device 400. Base plate 406 may connect to outer shell 402 and may be removed. Connection of the base plate 406 to outer shell 402 may result through standard connection means and/or utilization of a snaphook, such as snaphook 410 affixed to base plate 408. Base plate 408 may affix to the outer shell 402 via snaphook 410. Snaphook 410 may provide for a more secure connection between the outer shell 402 and base plate 408, thereby providing greater protection for PCB 404. In other examples, the outer shell 402 may be connected to the base plate 406 via other fastening means, such as utilizing at least one screw and/or nail, or in alternative embodiments, the fastening means may include a type of adhesive (e.g., glue-like material).

Figure 5:
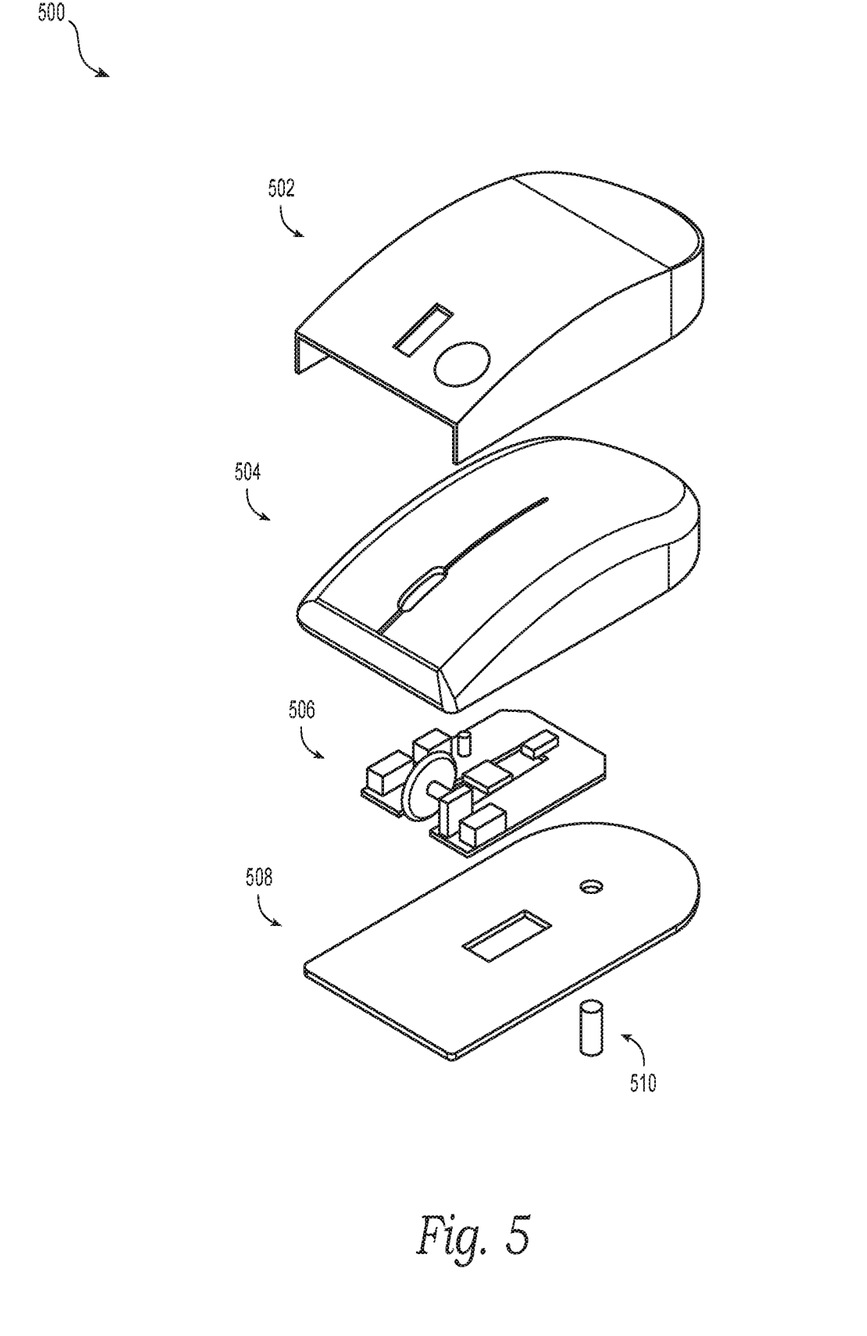
FIG. 5 is a side perspective view which illustrates the steps of a particular method of forming an embodiment of the moldable input device system, including connecting a thermoplastic mold, a rigid shell, a printed circuit board, and a base plate together.

FIG. 5 illustrates a side perspective view which illustrates the steps of a particular method of forming an embodiment of the moldable input device system 500, including connecting a thermoplastic mold layer 502, a rigid shell 504, a printed circuit board 506, and a base plate 508 together. As described previously, thermoplastic mold layer 502 may be affixed to shell 504 prior to and during the heating process. Shell 504, along with parts of the PCB 506 and base plate 508, may be comprised of certain plastic material with high melting point temperatures, such as acrylonitrile butadiene styrene (ABS) plastics. ABS plastics are amorphous and have no true melting point, so they can withstand high temperatures without changing shape. As such, input device 500 may be heated as a single component. For instance, input device 500 may be submerged in boiling water for a period of time to heat up the thermoplastic layer 502 to its melting point. Although thermoplastic layer 502 may be heated and moldable after being submerged in boiling water, outer shell 504, PCB 506, and base plate 508 may not be affected. Further, in such a configuration, base plate 508 may be affixed to PCB 506 and shell 504 via fastening means 510, such as a screw or bolt that may be fastened to prevent any entry of fluid (i.e., waterproof) into the cavity formed between the outer shell 504 and base plate 508.

In some embodiments, thermoplastic layer 502 may be molded across the entire outer shell 504. In other embodiments, as illustrated, the thermoplastic layer may leave an opening for a wheel slot (as part of a computer mouse) and/or an opening for a button, e.g., a left and/or right index-finger button. Such configurations may provide for smoother button functions on the input device 500.

In other aspects, the opening for the left index-finger may comprise a "pocket" to be filled by separate thermoplastic material. Such a "pocket" may provide for further customizability of the input device 500. For instance, a thermoplastic layer 502 may be deposited on outer shell 504. Additionally, a separate thermoplastic layer may be deposited in the circular area denoting the left index-finger button. This specific deposit of thermoplastic layer on the left index-finger button may allow for particular customizability based on a user's clicking behavior and physical characteristics of a user's index finger.

Figure 6:
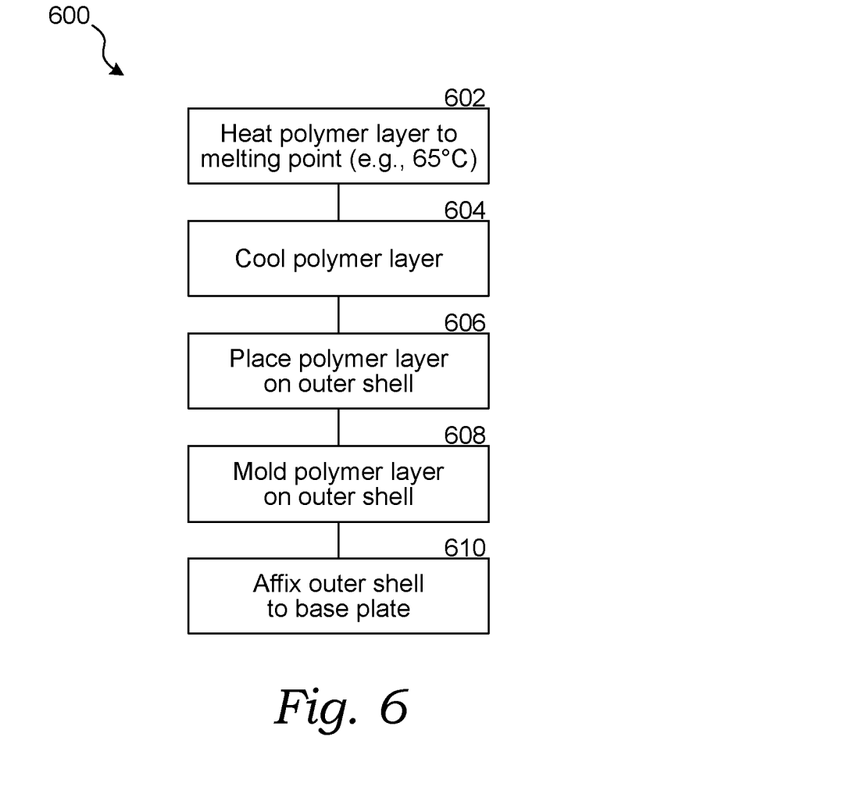
FIG. 6 is an example method for forming a moldable input device, as described herein.

FIG. 6 is an example method for forming a moldable input device, as described herein. Method 600 begins at step 602, where a polymer layer is heated to a melting point. As described previously, "melting point" refers to the temperature at which the material is pliable and/or moldable. In some instances, the melting point of a polymer like PCL may be 65° C. In other instances, the melting point of a polymer such as EVA may be as high as 90° C. Heating methods may include, but are not limited to, submerging the polymer layer in hot and/or boiling water for a period of time, placing the polymer layer in a heating oven or other heating enclosure/device, applying radiation (e.g., microwave), using induction heating, using electric heating, and other methods of heating.

Once the polymer layer is heated for a period of time, the method then proceeds to step 604, which is the cooling of the polymer layer. After heating, the polymer layer may need to be cooled for a period of time prior to molding. Cooling may occur by removing the polymer layer from the heating source and simply allowing the room temperature air to cool the layer. Other methods of cooling may comprise submerging the polymer layer in room temperature water for a period of time.

After the polymer layer is cooled, the method proceeds to step 606, where the polymer layer may be placed on the outer shell of a moldable input device. For instance, the outer shell of a moldable input device may comprise the outer shell of a computer mouse. The outer shell may be made of hard plastic, such as ABS plastic. In some example aspects, the polymer layer may cover the entire outer shell. In other examples, the polymer layer may cover a portion of the outer shell. For instance, the polymer layer may cover only the back portion of the outer shell, while leaving at least one button (e.g., the left index-finger and right middle-finger buttons) uncovered. In some instances, the polymer layer may be deposited on the outer shell in separate areas. For example, a portion of the polymer layer may be deposited in a "pocket" denoting a particular button, such as a side button on an input device. This deposit of polymer material may be separate from another deposit of polymer material that may cover the back portion of an input device. The separate deposit of polymer material for the side button may, in some aspects, allow for a customized button mold based on user behavior and physical characteristics (e.g., size of hand, shape of fingers, which finger tips typically engage a particular button, etc.).

After the polymer layer is placed on the outer shell, the method proceeds to step 608, where the polymer layer is molded onto the top of the outer shell. The molding step may be executed through human or non-human force. In some examples, a user may engage the polymer layer that is placed on the outer shell with his/her hand for a period of time. During this period of time, the user may move his/her hand around the mouse and simulate using the mouse, so the polymer layer molds to the physical characteristics and behavioral trends of the user. In other aspects, a non-human force (e.g., machine) may mold the polymer layer onto the outer shell.

After the polymer layer is molded onto the outer shell, the method proceeds to step 610, where the outer shell is affixed to a base plate. At step 610, the outer shell—with the molded polymer layer attached—is affixed to a base plate. As described previously, the outer shell and base plate may snap together using a snaphook, waterproof fastening means, and/or other connection means. The connection of the outer shell and the base plate may form an enclosed cavity, wherein circuitry that controls the electrical signals and operation of the input device resides. Such circuitry may take the form of a PCB and/or multiple PCB's. Once the base plate is affixed to the outer shell, the moldable input device may be ready for use with a computer and/or other electronic device in which a pointing device may control the GUI.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:
1. A moldable input device, comprising:
   a thermoplastic layer configured to be heatable to achieve a moldable condition which allows reconfiguration of the thermoplastic layer;
   a rigid shell affixed to a bottom face of the thermoplastic layer, wherein the thermoplastic layer comprises at least two separate deposits, and wherein at least one of the two separate deposits of the thermoplastic layer is located in a pocket denoting at least one top button affixed to the rigid shell; and
   a base plate affixed to the rigid shell, wherein the base plate and the rigid shell house circuitry.
2. The moldable input device of claim 1, wherein the thermoplastic layer is comprised of polycaprolactone.
3. The moldable input device of claim 1, wherein the thermoplastic layer is comprised of ethylene vinyl acetate.
4. The moldable input device of claim 1, wherein the thermoplastic layer maintains a fixed configuration at a temperature below about 42° C. and maintains the moldable condition at a temperature between about 42° C. and about 75° C.
5. The moldable input device of claim 4, wherein the thermoplastic layer achieves the moldable condition by heating the thermoplastic layer for a period of time within water.
6. The moldable input device of claim 4, wherein the thermoplastic layer achieves the moldable condition by heating the thermoplastic layer for a period of time within a heated enclosure maintained above 42° C.
7. The moldable input device of claim 4, wherein the thermoplastic layer achieves the moldable condition by exposure of the thermoplastic layer for a period of time to an amount of radiation.
8. The moldable input device of claim 1, wherein the rigid shell comprises at least one edge, wherein the at least one edge separates the thermoplastic layer from at least one portion of the rigid shell.
9. The moldable input device of claim 8, wherein the at least one portion of the rigid shell is a left button and a right button affixed to a top side of the rigid shell.

10. The moldable input device of claim 1, wherein the base plate is affixed to the rigid shell via at least one fastening means.

11. The moldable input device of claim 4, wherein the thermoplastic layer achieves the moldable condition by submerging the thermoplastic layer, the rigid shell, and the base plate in an amount of liquid having a temperature between 60° C. and 100° C. for a period of time.

12. The moldable input device of claim 11, wherein the base plate is affixed to the rigid shell via at least one waterproof fastening means.

13. The moldable input device of claim 12, wherein the thermoplastic layer is permanently affixed to the rigid shell.

14. A moldable input device, comprising:
a rigid outer shell; and
a thermoplastic layer attachable to the rigid outer shell, wherein the thermoplastic layer is heatable to achieve a moldable condition which allows reconfiguration of the thermoplastic layer, wherein the thermoplastic layer comprises at least two separate deposits, and wherein at least one of the two separate deposits of the thermoplastic layer is located in a pocket denoting at least one side button affixed to the rigid outer shell.

15. The moldable input device of claim 14, wherein the rigid outer shell comprises at least one anchor port.

16. The moldable input device of claim 15, wherein the thermoplastic layer comprises at least one anchor, wherein the at least one anchor is configured to attach to the at least one anchor port.

17. The moldable input device of claim 14, wherein the at least one of the two separate deposits of the thermoplastic layer is located in a pocket denoting at least one top button affixed to the rigid outer shell.

18. A method for forming a moldable input device, comprising the steps of:
heating a polymer layer to at least 65° C. for a first period of time;
after the first period of time, cooling the polymer layer for second period of time;
placing the polymer layer on a rigid outer shell;
during the second period of time, molding the polymer layer on top of the rigid outer shell by forming the polymer layer, the polymer layer comprising at least two separate deposits, and wherein at least one of the two separate deposits of the polymer layer is selected from the group of locations consisting of: a location denoting at least one top button affixed to the rigid outer shell, a location denoting at least one side button affixed to the rigid outer shell, or a combination thereof; and
after the second period of time, affixing the rigid outer shell to a base plate, wherein the rigid outer shell and the base plate form an enclosed cavity that houses at least one printed circuit board.

19. The method of claim 18, wherein the polymer layer is comprised of polycaprolactone.

20. The moldable input device of claim 1, wherein the at least one of the two separate deposits of the thermoplastic layer is located in a pocket denoting at least one side button affixed to the rigid shell.

* * * * *